(12) United States Patent
Zellweger

(10) Patent No.: US 7,343,927 B2
(45) Date of Patent: Mar. 18, 2008

(54) BLOCKING ELEMENT, ESPECIALLY AN EXPLOSION PROTECTION VALVE

(75) Inventor: Juerg Zellweger, Waldstatt (CH)

(73) Assignee: Rico Sicherheistechnik AG, Herisau (CH)

( * ) Notice: Subject to any disclaimer, the term of this patent is extended or adjusted under 35 U.S.C. 154(b) by 0 days.

(21) Appl. No.: 10/534,466

(22) PCT Filed: Nov. 6, 2003

(86) PCT No.: PCT/CH03/00725

§ 371 (c)(1),
(2), (4) Date: May 11, 2005

(87) PCT Pub. No.: WO2004/048828

PCT Pub. Date: Jun. 10, 2004

(65) Prior Publication Data

US 2006/0049373 A1    Mar. 9, 2006

(30) Foreign Application Priority Data

Nov. 22, 2002  (CH) .................................. 1964/02
Apr. 8, 2003  (CH) .................................. 0633/03

(51) Int. Cl.
*F16K 17/26* (2006.01)
*F16K 31/00* (2006.01)
(52) U.S. Cl. .................... 137/460; 137/493.9; 251/62
(58) Field of Classification Search ................. 251/62; 137/461, 460, 459, 493.9, 517
See application file for complete search history.

(56) References Cited

U.S. PATENT DOCUMENTS

| | | | | |
|---|---|---|---|---|
| 920,716 A | * | 5/1909 | Beckman | 137/513.3 |
| 1,125,315 A | * | 1/1915 | Hayward | 137/459 |
| 1,218,089 A | * | 3/1917 | Kail | 137/459 |
| 1,956,010 A | * | 4/1934 | Dieschber | 137/460 |
| 2,806,484 A | * | 9/1957 | Schultz | 137/460 |
| 3,085,589 A | * | 4/1963 | Sands | 137/498 |
| 3,326,233 A | * | 6/1967 | Perruzzi | 137/460 |
| 3,683,957 A | | 8/1972 | Sands | |
| 4,456,029 A | * | 6/1984 | McCrum | 137/498 |
| 4,562,861 A | * | 1/1986 | Payton | 137/493.9 |
| 4,811,756 A | * | 3/1989 | Hall | 137/498 |
| 5,207,243 A | * | 5/1993 | Sarro | 137/498 |
| 5,293,898 A | * | 3/1994 | Masloff | 137/517 |
| 5,806,832 A | * | 9/1998 | Larbuisson | 251/149.6 |

FOREIGN PATENT DOCUMENTS

| | | |
|---|---|---|
| DE | 102 13 865 A1 | 10/2002 |
| EP | 0 192 474 A2 | 8/1986 |
| GB | 1 228 079 | 4/1971 |

* cited by examiner

Primary Examiner—Ramesh Kirshnamurthy
Assistant Examiner—Andrew J. Rost
(74) Attorney, Agent, or Firm—The Nath Law Group; Jerald L. Meyer; Derek Richmond

(57) ABSTRACT

A closing body (3) which is mounted in a housing (2) in such a way that it can be axially displaced and can be pressed out of an opening position against a valve seat (4) into a closing position. The closing body (3) is rotationally symmetrical and includes, on its outer diameter (D1) in relation to its cross-section, two outer wall sections (5, 5') which meet at an angle of less than 180°. In this way, a surrounding interference edge (26) is formed, favouring turbulence in the flow and thus a rapid increase in the dynamic pressure. When the closing body is embodied as a hollow body, a spring action also occurs, damping the closing movement.

21 Claims, 4 Drawing Sheets

Figure 1:
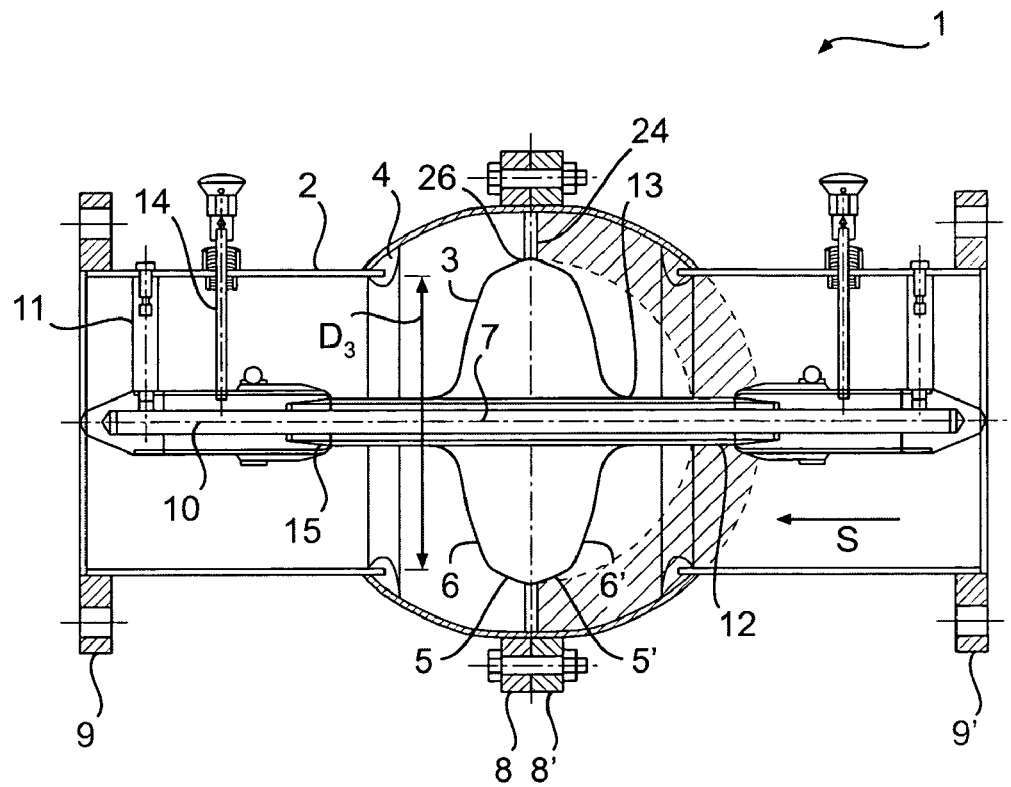

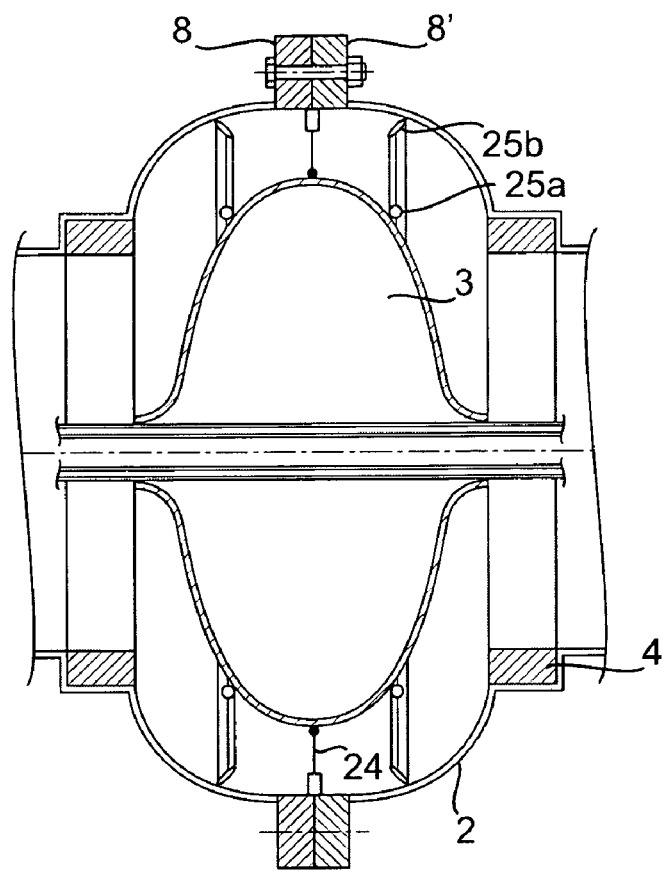
FIG. 9
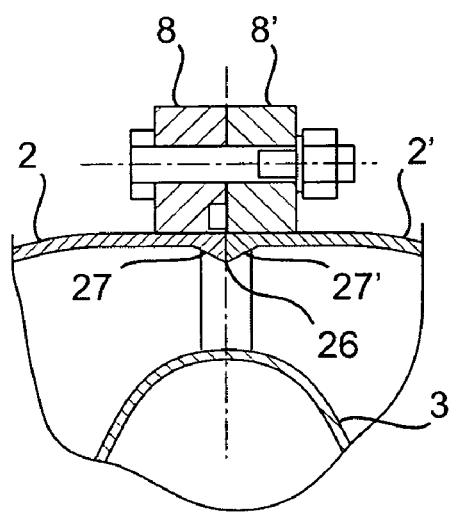 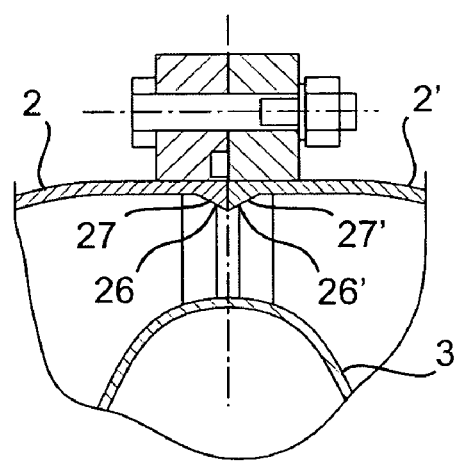
FIG. 10  FIG. 11

BLOCKING ELEMENT, ESPECIALLY AN EXPLOSION PROTECTION VALVE

The invention relates to a shut-off device, especially an explosion protection valve.

Devices of this type are used, for example, to prevent the propagation of pressure waves and flame fronts following an explosion in pipelines. In an explosion, the valve closes as a result of the kinetic energy of the pressure wave which runs ahead of a flame front. Generically comparable shut-off devices have become known, for example, through DE 28 01 950, DE 102 13 865 or EP 172 364. An important aspect in passive mechanical explosion isolation here consists in the fact that the closing body, when a defined dynamic pressure is exceeded within a likewise defined closing time, moves from the open setting into the close setting and is fixed there in the closed position.

The known explosion protection valves generally have a closing body of elliptical cross section. This shape is chosen for fluidic reasons in order to ensure the least possible flow obstruction in the open setting. The closing bodies are in this case pressed from sheet steel and form a hollow body in order to keep also the inert mass as small as possible. According to DE 28 01 950 mentioned in the introduction, the cavity of the valve body is additionally filled with a plastic which has damping properties. A drawback of known closing bodies is, however, that the rounded outer section, in the event of an increase in flow velocity, does not promote just the same kind of increase in dynamic pressure. A further drawback of known closing bodies consists in their relative rigidity, which is promoted by the conventional shaping. In the event of impact with the valve seat, this can lead to high material stresses in the closing body, with deformations of the closing body.

An object of the invention is therefore to provide a shut-off device of the type stated in the introduction, in which the build-up of a critical dynamic pressure at the closing body is promoted without, in normal operation, impairing the flow.

The interfering means for generating a turbulent flow are disposed on the outer side of the closing body and/or on the inner side of the housing, especially in the region of the flow area formed between the closing body in the open setting and the housing. If the flow intensity increases, the interfering means give rise to an increasing turbulence and thus a rapid increase in dynamic pressure, whereby the closing movement is induced. Through this simple measure, it has surprisingly been shown that the retaining forces for holding the closing body in the open setting can be set higher, which, in turn, prevents malfunctions in the normal operation of the valve. The interfering means can have any chosen configuration which is suitable for producing a break in flow and hence turbulence.

Said interfering means can be constituted, for example, by baffles jutting into the flow area. The baffles in question are constituted, particularly simply, by one or more interfering rings disposed on the closing body or on the housing. The interfering rings can be of rectangular or circular configuration in cross section.

The interfering means in question can also, however, be constituted by at least one interfering edge, which extends at least partially along the flow area and at which at least two wall portions meet at an angle of less than 180°. This type of edge, too, is capable of breaking a laminar flow and of creating turbulence.

The interfering edge can be disposed, for example, on the closing body and especially on its outer diameter.

Preferably, the configuration of the closing body is chosen such that it, at least on the side facing the valve seat, runs in relation to its cross section from its center axis to the outer diameter in at least two differently inclined or curved outer wall portions. These two wall portions can meet, in this case, approximately in the diametral region of the valve seat. A combination of curved and inclined (straight) portions is also, of course, conceivable. The closing body could here run from the center axis to the outer diameter, to begin with preferably in an approximately elliptically curved or conical path, and then in a frustoconical path. In the case of this mixed configuration, the conventional elliptical shape of the cross section is altered only, specifically, in the outermost region.

The interfering edge could also, however, readily be disposed on the housing and, in particular, in the connecting region of two housing halves.

The two wall portions forming an interfering edge advantageously meet at an angle between 60° and 179°, preferably at 120°. The mutually abutting wall portions could readily be concavely or convexly curved.

Finally, it is also conceivable for the two wall portions forming an interfering edge to form a circumferential recess in the closing body and/or in the housing. With this type of configuration, too, turbulence is achieved.

If the closing body is configured as a hollow body, the cross-sectional shape according to the invention yields additional advantages, since the arrangement of the wall portions in the outermost peripheral region promotes a spring action of the closing body. The hollow body herein acts likes a cup spring, which absorbs shocks in the axial direction. This prevents the velocity of the closing body, in the event of impact with the valve seat, from being reduced, virtually at a stroke, to zero. This advantage is particularly attained when the closing body is made from sheet metal and when it is fastened on a guide tube. The closing body can herein be formed from two identical shells, which are joined together on the outer diameter. Such shells can be made relatively easily and cheaply by cold deformation, for example by deep-drawing and/or pressing, e.g. from steel or aluminum. Of course, the closing body could also, however, be made in monolithic construction, for example from a suitable plastics material or from rubber. According to whether the explosion protection valve is configured to act on both sides or only on one side, the closing body Can be configured symmetrically or asymmetrically in relation to a plane running at right angles to the center axis.

Figure 2:
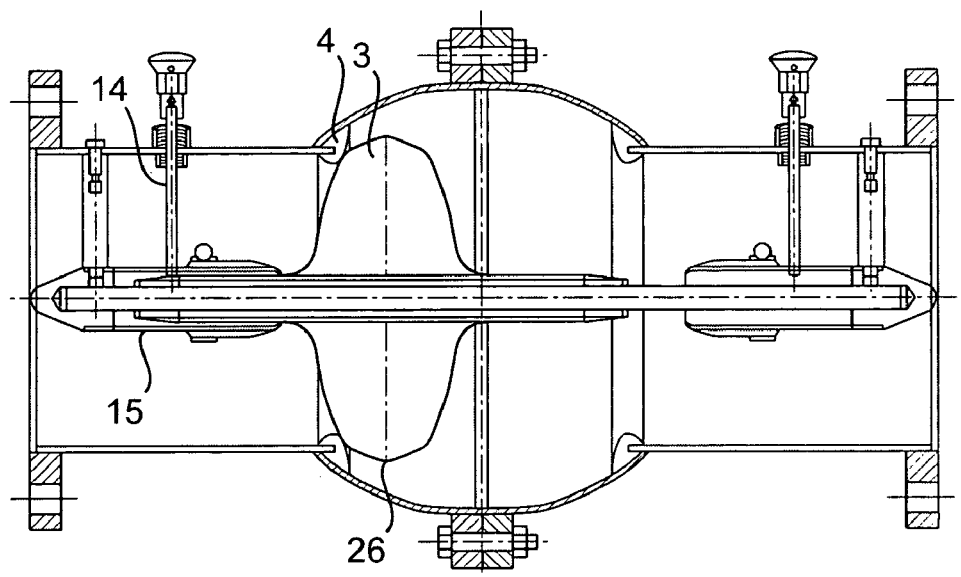
Figure 3:
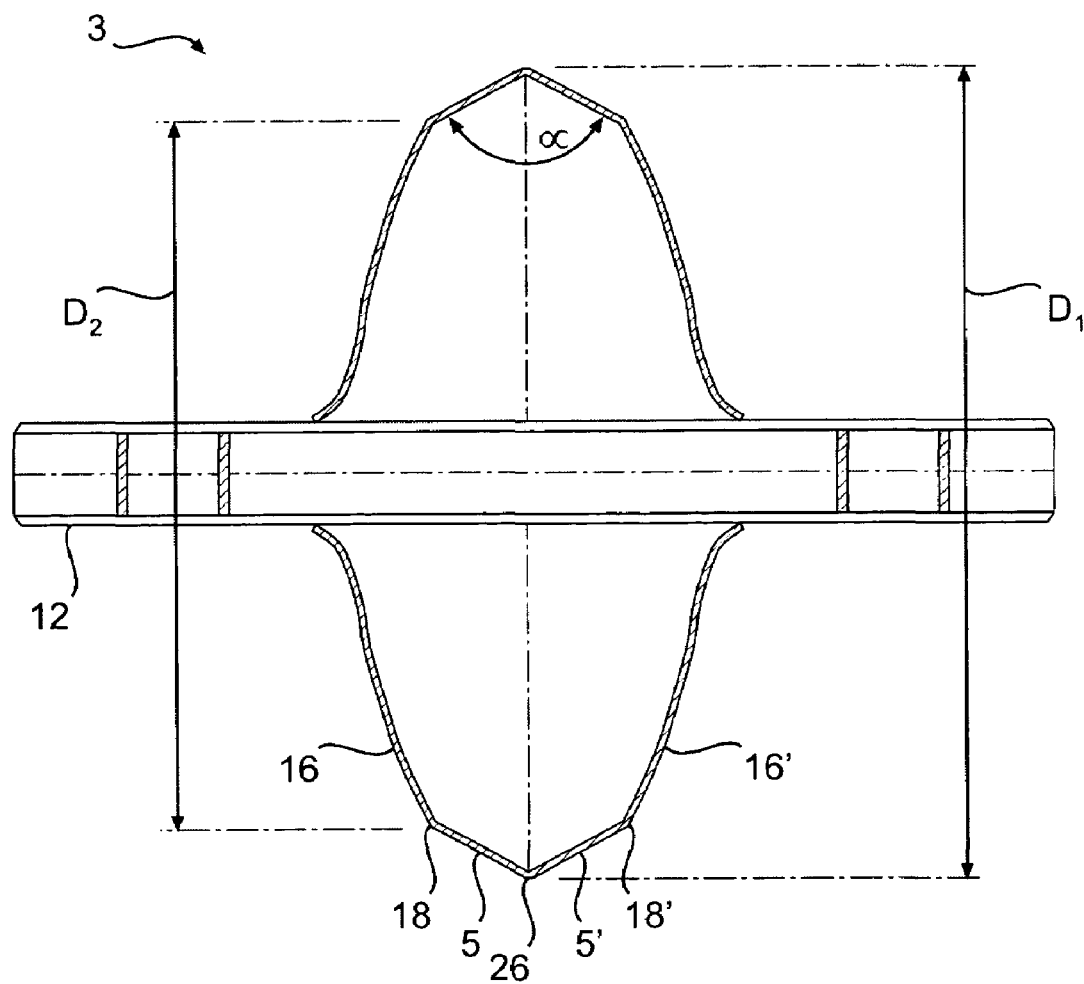
Figure 4:
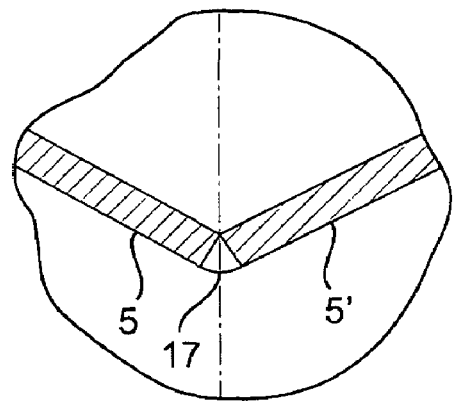
Figure 5:
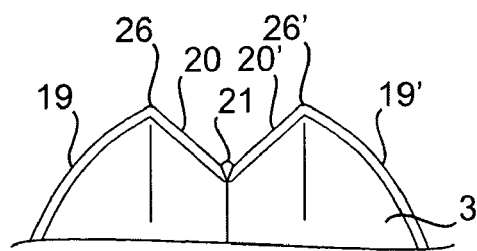
Figure 6:
Figure 7:
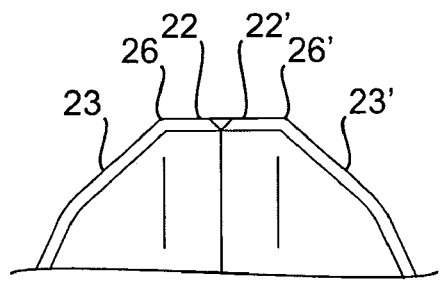
Figure 8:
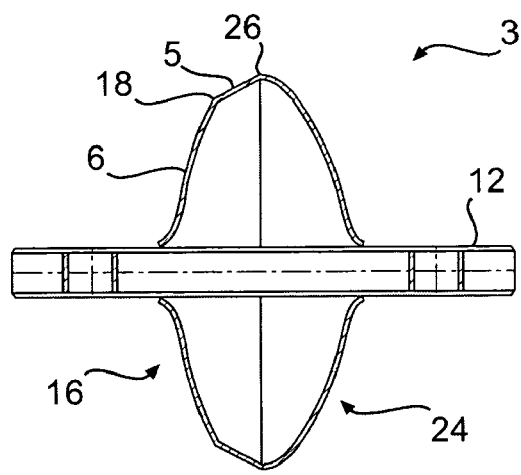

Illustrative embodiments of the invention are described in greater detail below and are represented in the drawings, wherein FIG. 1 shows a cross section through an explosion protection valve with the closing body in open setting, FIG. 2 shows the explosion protection valve according to FIG. 1 with the closing body in close setting, FIG. 3 shows a cross section through the closing body according to FIGS. 1 and 2, on an enlarged scale, FIG. 4 shows a detail of the closing body according to FIG. 3 on the outermost peripheral region, once again on an enlarged scale, FIGS. 5-7 show further illustrative embodiments of the closing body as partial cross sections on the outer periphery, FIG. 8 shows a cross section through a closing body which acts only on one side, FIG. 9 shows a partial cross section through an alternative illustrative embodiment of an explosion protection valve having interfering rings in place of interfering edges, FIG. 10 shows a partial cross section through an alternative illustrative embodiment having an interfering edge on the housing, and FIG. 11 shows a further modified illustrative embodiment having two interfering edges on the housing.

As represented in FIGS. 1 and 2, an explosion protection valve 1 essentially consists of a housing 2 and of a closing body 3 mounted displaceably therein. The housing is configured in two parts, the two housing parts being screwed together on the center flanges 8, 8'. The housing can be integrated into a pipeline by the outer flanges 9, 9'.

The closing body 3 is fixed on a guide tube 12, which, for its part, is guided in the direction of the center axis 7 on a guide rod 10. This guide rod is fastened at both ends to the housing 2 by means of mountings 11. The closing body 3 is held by means of at least one spring 13 in its neutral opening position represented in FIG. 1. For the keeping-open and triggering of the closing body, various solutions (not described in detail here) are, however, conceivable. In this context, reference is made to the prior publications mentioned in the introduction.

At both ends of the guide tube 12 there is respectively disposed a collecting cone 15, which tapers towards the end. This Collecting cone cooperates with a spring-loaded locking bolt in such a way that, in the close setting represented in FIG. 2, the locking bolt engages behind the collecting cone and thereby locks the closing body 3 in the close setting. The closing body is hereupon pressed against the valve seat 4, which generally consists of an elastic seal.

The closing body 3 forms on its outer diameter, with the two mutually inclined outer wall portions 5, 5' an interfering edge 26. Between this interfering edge and the inner side of the housing 2, on the plane between the two center flanges 8, 8', there is formed a circular flow area 24, which is represented with dash-dot lines in the form of a flip-over.

In the represented illustrative embodiment, a closing movement and fixing of the closing body in both motional directions is possible. If an explosion pressure wave appears, for example, in the flow direction s, the pressure shock gives rise to a displacement of the closing body in the same direction into the close setting. The closing body thus forms a secure barrier against pressure and flames with respect to all parts of the plant which are situated downstream. If the locking bolt 14 is pulled up, the closing body is released, whereupon it returns, under the influence of the spring 13, back into its neutral starting position.

FIGS. 3 and 4 show further details of the closing body 3. This is made up of the rotationally symmetrical hollow shells 16, 16', which are made out of sheet steel and which are welded to the guide tube 12. A circumferential weld seam 17 runs also on the outer diameter D1. There, the two outer wall portions 5, 5' meet at an angle α of, for example, 120°. As will be evident, this forms an obtuse-angled edge on the weld seam 17. The inner-situated outer wall portion 6, 6' runs in a gentle curve, to be precise corresponding to an elliptical interfering edge 26. Directly in the peripheral region of the guide tube 12, the curvature, for fluidic reasons, runs the opposite way. The two outer wall portions 5, 5' stand at an angle one to the other and thus likewise form an offset or an edge 18, running approximately on the diameter D2. This diameter is equal or almost equal to the diameter D3 of the valve seat (FIG. 1).

As will be evident, modifications can conceivably be made to the represented illustrative embodiment without thereby departing from the subject of the invention.

Thus FIG. 5 shows a variant, for example, in which two outer wall portions 19, 20 and 19', 20' respectively form a circumferential recess 21 in the closing body 3. In the illustrative embodiment according to FIG. 6, a plurality of circumferential recesses are formed in the same way, so that, in cross section, a bellows-like structure is obtained.

In the illustrative embodiment according to FIG. 7, the two outer wall portions 22, 22' form on the outer diameter a short cylindrical portion. This stands at a certain angle to the outer wall portions 23, 23', so that interfering edges 26, 26' are likewise formed.

FIG. 8 shows a closing body 3 for a valve having only one valve seat. The shell 16 possesses, as described, the two outer wall portions 5 and 6, which form the edge 18. The shell 24, which does not have to bear against a valve seat, is nevertheless elliptically curved in the conventional manner. The two shells meet, however, at an angle of less than 180°.

In the illustrative embodiment according to FIG. 9, no interfering edges, but rather baffles in the form of interfering rings are used as interfering means for influencing the flow. Thus, lamellar interfering rings 25b are disposed at several places on the inner side of the housing 2. On the outer side of the closing body 3, on the other hand, circular interfering rings 25a are fastened. These can be constituted, for example, by welded-on wire rings. Of course, other ring-like configurations would also be conceivable.

The illustrative embodiments according to FIGS. 10 and 11 again show interfering means in the form of interfering edges, which are not, though, disposed on the closing body 3, but on the inner side of the housing 2. According to FIG. 10, the two housing halves 2, 2', in the region of their mutual abutment, are drawn somewhat inward, so that the mutually inclined inner wall portions 27, 27' form an interfering edge 26. It would also be conceivable, however, for the two inner wall portions 27, 27' to be assigned to the two center flanges 8, 8' and for the housing halves 2, 2' to bear obtusely against the flanges 8, 8'.

In the illustrative embodiment according to FIG. 11, the design is similar to that in the illustrative embodiment according to FIG. 10. The two inner wall portions 27, 27' do not, however, meet directly at an obtuse angle, but rather a hollow-cylindrical region remains in the region of the smallest inner diameter. Two interfering edges 26, 26' are thereby obtained. As will be evident, further modifications and combinations are conceivable. Thus, interfering rings and interfering edges could also, for example, be jointly disposed on the closing body and/or on the housing.

The shut-off device in question does not necessarily have to be an explosion protection valve. The described closing body could also advantageously be used in respect of other shut-off devices, for example in those having an external drive mechanism.

The invention claimed is:

1. An explosion protection valve (1) having a housing (2) and having a rotationally symmetrical closing body (3), guided within the housing, which, under the influence of a dynamic pressure can be pressed out of an open setting, in at least one motional direction (s) against a valve seat (4) into a sealing close setting and can be locked in a closed position by means of a catch device which is a collecting cone (15), wherein on the outer side of the closing body (3) in the region of the flow cross-section (24) formed between the closing body in the open setting and the housing, there are disposed interfering means (18, 25) for generating a turbulent flow for rapidly increasing the dynamic pressure inducing the closing movement from said open position into the closed position in which the closing body is locked by the catch device, the interfering means have at least one interfering edge (26), which extends at least partially along a flow cross-section (24) and at which at least two wall portions meet at an angle less than 180°, whereas the interfering edge (26) is disposed on the closing body on its outer diameter (D1), the closing body (3), at least on the side facing the valve seat (4), runs in relation to its cross section from its center axis (7) to the outer diameter (D1) in at least two differently inclined or curved outer wall portions (5, 6, and 5', 6' respectively), said outer wall portions begin with a first outer wall portion (6 and 6' respectively) and then with a second outer wall portion 5 and 5' respectively), whereas the first outer wall portion defining an outwardly convex elliptical curve and the second outer wall portion defining a conical path.

2. The explosion protection valve as claimed in claim 1, characterized in that the interfering means (25, 25a, 26) are disposed in the region of the flow cross-section (24) formed between the closing body in the open setting and the housing (2).

3. The explosion protection valve as claimed in claim 1, wherein the first outer wall portion and the second outer wall portion run approximately on a diameter (D2), which is equal or almost equal to a diameter (D3) of the valve seat (4).

4. The explosion protection valve as claimed in claim 1, characterized in that the closing body (3) runs in relation to its cross section from its center axis (7) to the outer diameter (D1), in an elliptically curved or conical toward a frusto-conical path.

5. The explosion protection valve as claimed in claim 1, characterized in that the interfering edge (26) is disposed on the housing in the connecting region of two housing halves (2, 2').

6. The explosion protection valve as claimed in claim 1, wherein said two wall portions forming an interfering edge meet at an angle (α) between 60° and 179°.

7. The explosion protection valve as claimed in claim 1, characterized in that the two wall portions forming an interfering edge form a circumferential recess in the closing body and/or in the housing (2).

8. The explosion protection valve as claimed in claim 1, wherein said closing body (3) is configured as a hollow body.

9. The explosion protection valve as claimed in claim 8, wherein the closing body is made from sheet metal and in that it is fastened on a guide tube (12).

10. The explosion protection valve as claimed in claim 9, wherein the closing body (3) is formed from two identical shells (16, 16'), which are joined together on the outer diameter (D1).

11. The explosion protection valve as claimed in claim 1, characterized in that the interfering means are baffles jutting into the flow cross-section (24).

12. The explosion protection valve as claimed in claim 11, characterized in that the baffles having one or more interfering rings (25a, 25b) disposed on the closing body (3).

13. The explosion protection valve as claimed in claim 1, characterized in that additional interfering means (25, 25a, 26) for generating a turbulent flow are disposed on the inner side of the housing (2).

14. A shut-off device having a housing (2) and having a rotationally symmetrical closing body (3), guided within the housing, which, under the influence of a dynamic pressure can be pressed out of an open setting, in at least one motional direction (s) against a valve seat (4) into a sealing close setting, wherein on the inner side of the housing (2) in the region of the flow cross-section (24) formed and defining an annular passage between the closing body and the housing, there are disposed interfering means (25, 25a, 26) for generating a turbulent flow, whereas said closing body (3) is comprised of at least two differently inclined or curved outer wall portions (5, 6, and 5', 6' respectively), said outer wall portions begin with a first outer wall portion (6 and 6' respectively) and then with a second outer wall portion 5 and 5' respectively), whereas the first outer wall portion defining an outwardly convex elliptical curve and the second outer wall portion defining a conical path.

15. The shut-off device as claimed in claim 14, characterized in that interfering means (25b, 26) are disposed in the region of the flow cross-section (24) formed between the closing body in the open setting and the housing (2).

16. The shut-off device as claimed in claim 14, characterized in that the interfering means are baffles jutting into the flow cross-section (24).

17. The shut-off device as claimed in claim 16, characterized in that the baffles having one or more interfering rings (25a, 25b) disposed on the housing (2).

18. The shut-off device as claimed in claim 14, characterized in that the closing body (3) is configured as a hollow body.

19. The shut-off device as claimed in claim 18, characterized in that the closing body is made from sheet metal and in that it is fastened on a guide tube (12).

20. A shut-off device having a housing (2) and having a rotationally symmetrical closing body (3), guided within the housing, which, under the influence of a dynamic pressure can be pressed out of an open setting, in two motional directions (s) against a valve seat (4) into a sealing close setting, wherein on the inner side of the housing (2) between the valve seats (4), there are disposed interfering means (25b, 26) for generating a turbulent flow, wherein said closing body (3) is comprised of at least two differently inclined or curved outer wall portions (5, 6, and 5', 6' respectively), said outer wall portions begin with a first outer wall portion (6 and 6' respectively) and then with a second outer wall portion 5 and 5' respectively), whereas the first outer wall portion defining an outwardly convex elliptical curve and the second outer wall portion defining a conical path.

21. An explosion protection valve (1) having a housing (2) and having a rotationally symmetrical closing body (3), guided within the housing, which, under the influence of a dynamic pressure can be pressed out of an open setting, in at least one motional direction (s) against a valve seat (4)

into a sealing close setting and there can be locked in a closed position by means of a catch device, wherein on the outer side of the closing body (3) in the region of the flow cross-section (24) formed between the closing body in the open setting and the housing, there are disposed interfering means (18, 25) for generating a turbulent flow for rapidly increasing the dynamic pressure inducing the closing movement from said open position into the closed position in which the closing body is locked by the catch device, the interfering means have at least one interfering edge (26), which extends at least partially along a flow cross-section (24) and at which at least two wall portions meet at an angle less than 180°, whereas the closing body (3) is configured as a hollow body, in such a way that the outermost peripheral region is adapted to promote a spring action of the closing body.

* * * * *